US005973592A

United States Patent [19]

Flick

[11] Patent Number: 5,973,592

[45] **Date of Patent: *Oct. 26, 1999**

[54] VEHICLE SECURITY SYSTEM INCLUDING A REMOTE UNIT THAT EMULATES SECURITY SYSTEM CONDITION LOCAL INDICATIONS AND RELATED METHOD

[76] Inventor: Kenneth E. Flick, 5236 Presley Pl., Douglasville, Ga. 30125

[ * ] Notice: This patent is subject to a terminal disclaimer.

[21] Appl. No.: 09/059,104

[22] Filed: Apr. 13, 1998

Related U.S. Application Data

[63] Continuation-in-part of application No. 08/582,759, Jan. 4, 1996, Pat. No. 5,739,747.

[51] Int. Cl.[6] ........ B06Q 1/00

[52] U.S. Cl. ........ 340/426; 340/525; 340/539; 307/10.2

[58] Field of Search ........ 340/426, 438, 340/539, 525, 825.36; 307/10.1, 10.2

[56] References Cited

U.S. PATENT DOCUMENTS

| | | | |
|---|---|---|---|
| 4,067,411 | 1/1978 | Conley et al. | 340/426 |
| 4,673,921 | 6/1987 | Saito et al. | 340/539 |
| 4,689,603 | 8/1987 | Conigliaro et al. | 340/64 |
| 4,724,425 | 2/1988 | Gerhart et al. | 340/539 |
| 4,940,964 | 7/1990 | Dao | 340/438 |
| 5,049,867 | 9/1991 | Stouffer | 340/426 |
| 5,054,569 | 10/1991 | Scott et al. | 180/167 |
| 5,079,538 | 1/1992 | DeFino | 340/426 |
| 5,276,728 | 1/1994 | Pagliaroli et al. | 340/426 |
| 5,357,560 | 10/1994 | Nykerk | 379/59 |
| 5,382,948 | 1/1995 | Richmond | 340/825.36 |
| 5,432,495 | 7/1995 | Tompkins | 340/426 |
| 5,451,926 | 9/1995 | Li | 340/426 |
| 5,535,844 | 7/1996 | Samford | 340/426 |
| 5,543,776 | 8/1996 | L'Esperance et al. | 340/426 |
| 5,543,778 | 8/1996 | Stouffer | 340/426 |
| 5,559,491 | 9/1996 | Stadler | 340/426 |
| 5,739,747 | 4/1998 | Flick | 340/426 |

*Primary Examiner*—Edward Lefkowitz
*Assistant Examiner*—Davetta Woods
*Attorney, Agent, or Firm*—Allen, Dyer, Doppelt, Milbrath & Gilchrist, P.A.

[57] ABSTRACT

A vehicle security system includes a controller in the vehicle for generating a plurality of security system condition signals. A local indicator generates a plurality of local security system condition indications adjacent the vehicle based upon respective security system condition signals from the controller. A local transmitter generates transmitted signals based upon respective security system condition signals from the controller. A remote unit or indicator is adapted to be carried by the user when away from the vehicle for receiving the transmitted signals from the local transmitter and for generating a plurality of remote security system indications which emulate the local security system condition indications generated by the local indicator. In other terms, the remote indicator means emulates the same predetermined pattern as the indications given at the vehicle by the local indicator means but uses a different indicator to indicate the pattern. In various embodiments, the local and remote indications may be one or more of audible tones, vibrations, flashing lights, displayed messages, or combinations thereof, for example. Method aspects of the invention are also disclosed.

29 Claims, 4 Drawing Sheets

| FCN. NO. | LOCAL INDICATION | REMOTE INDICATION |
|---|---|---|
| 1 | TWO SAME LENGTH CONTINUOUS TONES | TWO SAME LENGTH VIBRATING PULSES |
| 2 | TWO SAME LENGTH TONES | TWO SAME LENGTH LIGHT PULSES |
| 3 | THREE LONG LIGHT PULSES EACH SEPARATED BY SHORT TIME | THREE LONG TONES EACH SEPARATED BY SHORT TIME |
| 4 | TWO DIFFERENT LENGTH TONES | TWO DIFFERENT LENGTH VIBRATING PULSES |

VEHICLE SECURITY SYSTEM INCLUDING A REMOTE UNIT THAT EMULATES SECURITY SYSTEM CONDITION LOCAL INDICATIONS AND RELATED METHOD

RELATED APPLICATIONS

This application is a continuation-in-part of U.S. patent application Ser. No. 08/582,759 filed on Jan. 4, 1996, and now U.S. Patent No. 5,739,747, and which is hereby incorporated herein by reference in its entirety.

FIELD OF THE INVENTION

The present invention relates to the field of security systems and, more particularly, to a security system for installation in a vehicle and having advanced system condition indicating features.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may also be used as sensors. In addition, radar sensors may be used to monitor the area proximate the vehicle. The controller also typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. The remote transmitter may be used to arm and disarm the controller in the vehicle or provide other remote control features from a predetermined range outside the vehicle.

Many other features may be incorporated into a vehicle security system. For example, as disclosed in U.S. Pat. No. 4,887,064 to Drori et al. The controller may include self-diagnostics. A flashing LED, sound signal, or voice message may be used to give an indication that the alarm has been triggered. The audible alarm signal may be selected by the user. An alarm may also be given when power is restored after having been disconnected, as when a thief disconnects the power to avoid the security system and attempts to then start the vehicle. An LED is mounted on the vehicle instrument panel or dashboard so that the controller may visually communicate with the user. A keypad may also be mounted within the vehicle to permit the user to program certain features of the security system. Control functions may also be implemented by the security system including: accessory, pulsed alarm, hood release, ignition cutoff, door lock and unlock.

A vehicle security system may also include a passive arming feature wherein the status of all trigger inputs is monitored in several protection zones. These zones may include the passenger compartment, the engine compartment, the trunk, and additional sensor zones such as for motion, impact, and or glass breakage. When the ignition key is turned off, the system begins the passive arming process. If all zones are secure, normal arming occurs after expiration of an exit delay. If any zone becomes active during the exit delay, the process begins again.

Other features may also be incorporated in a vehicle security system. For example, U.S. Pat. No. 5,382,948 to Richmond discloses a vehicle security system including anti-carjacking features. The vehicle security system includes a speaker at the vehicle for the purpose of providing an acknowledgment signal, such as a chirp, to incidate that the supervisory control unit is armed/disarmed or to provide other audible response signals as well as intruder warning notices and siren functions. The system further includes a remote transmitter and receiver unit having a miniature speaker which provides an audible sound such as a chirp to indicate acknowledgement of a signal transmission, advise of the status of the supervisory control unit, etc. An LED is also provided for visual indication that a signal is being transmitted or that the battery strength is adequate. Unfortunately, for a typical vehicle security system, a number of important security system conditions may be of interest to the vehicle owner when away from the vehicle. A simple acknowledgement of a signal transmission or of an alarm indication may be of only limited value to the owner.

SUMMARY OF THE INVENTION

In view of the foregoing background it is therefore an object of the present invention to provide a vehicle security system and related method for giving a variety of indications to the user away from the vehicle of a status or condition of the security system from among a plurality of such conditions.

It is another object of the present invention to provide a vehicle security system and related method for giving remote indications to a vehicle owner so that such indications may be readily understood and appreciated by the owner.

These and other objects, features and advantages according to the invention are provided by a vehicle security system comprising a controller in the vehicle for generating a plurality of security system condition signals; local indicator means for generating a pluralist of local security system condition indications adjacent the vehicle responsive to respective security system condition signals from the controller; a local transmitter for generating a plurality of transmitted signals based upon respective security system condition signals from the controller; and remote indicator means adapted to be carried by a user when away from the vehicle for receiving the transmitted signals from the local transmitter and for generating a plurality of remote security system indications which emulate a pattern of the local security system condition indications generated by the local indicator means. In other terms, the remote indicator means mimics a pattern of the indications given at the vehicle by the local indicator means but preferably uses a different indication. For example, two audible tones generated as a pattern from a local indicator can be emulated as two vibration signals or two light flashes generated from a remote indicator. Accordingly, the user need only be familiar with a single set of indications that are correlatingly common both at the vehicle and when away from the vehicle.

In one embodiment, the local indicator means preferably includes local audible indicator means for generating each local security system condition indication as a predetermined pattern of local audible indications. Thus, the remote indicator means also can comprise remote vibration indicator means for generating each remote security system condition indication as a predetermined pattern of remote vibrating indications which emulate the predetermined pattern of the local audible indications for the security system condition. Each predetermined pattern of local audible indications is preferably at least one continuous sound having a predetermined duration. Each predetermined pattern of local audible indications may also comprise a plurality of continuous sounds each having a predetermined duration and with adjacent sounds separated by predetermined time intervals. For example, the local indicator means may comprise one of a vehicle horn and a vehicle siren, and the remote vehicle indicator means may include a vibration generator capable of generating a vibration which emulates the predetermined pattern of audible signals or indications generated by operation of the horn or siren.

In another embodiment of the invention, the local indicator means may comprise local audible indicator means for generating each local security system condition indication as a predetermined pattern of local audible indications, and the remote indicator means preferably comprises remote visual indicator means for generating each remote security system condition indication as a predetermined pattern of remote visual indications emulating the predetermined pattern of the local audible indications for the security system condition. The visual indications may be provided by flashing lamps of the same or different colors or the local audible indicator means may be a pattern of sounds or a continuous sounds.

The vehicle security system may further include a sensor, and the controller may be capable of generating an alarm condition signal in response to the sensor. The controller may also be movable between armed and disarmed states, and the controller may generate a passive arming condition signal. In addition, the controller may also generate a prewarn system condition signal responsive to sensing a person adjacent the vehicle.

A method aspect of the invention is for operating a vehicle security system comprising a controller positioned in the vehicle for generating a plurality of security system condition signals and a remote unit cooperating with the controller. The method preferably comprises the steps of: generating a plurality of local security system condition indications adjacent the vehicle responsive to respective security system condition signals from the controller; generating a plurality of transmitted signals based upon respective security system condition signals from the controller; and receiving the transmitted signals and generating at the remote unit a plurality of remote security system indications emulating a pattern corresponding to the local security system condition indications generated by local indicator means but having a different means for generating the plurality of remote indications.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set Further herein. Rather, these embodiments are provided so that this disclosure will be thorough and complete, and will fully convey the scope of the invention to those skilled in the art. Prime numbers, where used, illustrate like elements in alternate embodiments. Like numbers refer to like elements throughout.

Figure 1:
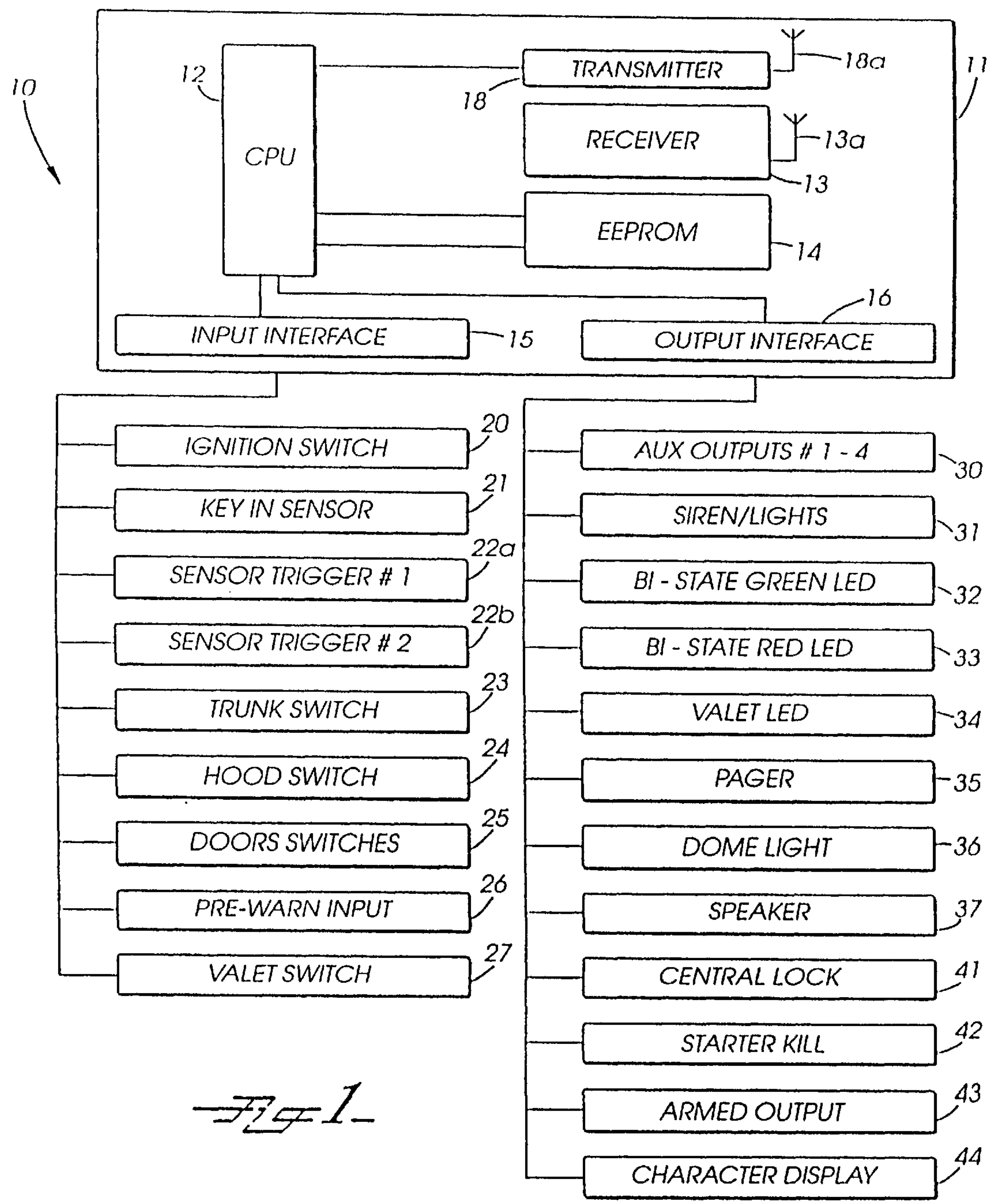
FIG. 1 is a schematic block diagram of the vehicle portion of a vehicle security system according to the invention.

Referring to the schematic block diagram of FIG. 1, the vehicle security system 10 according to the invention is first described. The security system includes a vehicle mounted portion 11 which in the illustrated embodiment includes a controller 12, such as may be provided by a central processing unit or microprocessor operating under stored program control. A receiver 13 is connected to the controller 12 for receiving signals from a remote transmitter as will be described in greater detail below. An antenna 13*a* is illustratively connected to the receiver 13. A local transmitter 18 and its antenna 18*a* are also connected to the controller 12. In the illustrated embodiment, the controller 12 is also operatively connected to a memory (EEPROM) 14 and a conventional input interface 15 and an output interface 16.

In the illustrated embodiment, the input interface 15 is connected to various vehicle inputs including: an ignition switch 10; a key in the ignition sensor 21; two zone sensors 22*a*, 22*b*; and conventional trunk hood and door pin switches 23, 24, and 25, respectively. In addition, a pre-warn sensor 26 and valet switch 27 also provide inputs to the controller 11 in the illustrated embodiment. As would be readily understood by those skilled in the art, other inputs are also contemplated by the present invention and are all generally described herein by the term sensor.

The output interface 16 of the controller 12 may preferably be connected to a plurality of outputs. As shown in FIG. 1, the outputs may include auxiliary relay outputs 30, such as for window control or remote starting, as would be readily understood by those skilled in the art. A siren and/or lights 31, and green and red light emitting diodes (LEDs) 32, 33 for dashboard mounting are also connected to the controller 11. Other outputs are directed to a valet LED 34, a dome light 36, and speaker 37, a central lock 41, a starter kill circuit 42, an armed relay output 43, and an alphanumeric or other visual character display 44.

Figure 2:
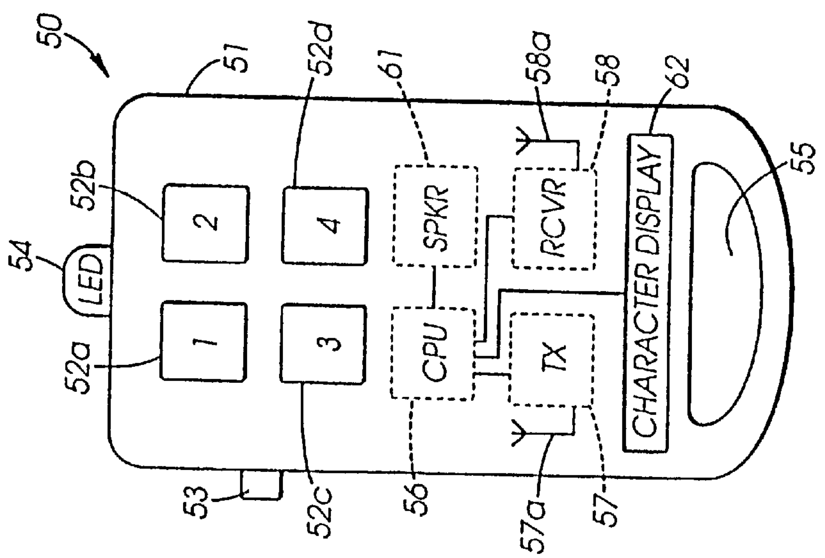
FIG. 2 is a schematic block diagram of a remote unit of the vehicle security system according to the invention.

Referring now additionally to FIG. 2, a remote unit 50 in accordance with the invention is described. The remote unit 50 includes a housing 51 and a plurality of first momentary contact switches 52*a*–52*d* carried by the housing. A second momentary contact switch 53 and an indicating light, such as the LED 54 are also carried by or mounted on the housing 51. As would be readily understood by those skilled in the art, the remote unit 50 is typically relatively small and includes an opening 55 for facilitating connection to a vehicle keyring. In addition, the remote unit 50 includes a central processing unit or microprocessor 56 operatively connected to the plurality of first switches 52*a*–52*d*, the second switch 53, and the LED 54. The microprocessor is also connected to a transmitter circuit 57 and its associated antenna 57*a* for transmitting signals to the controller 11 of the vehicle security system 10. The remote unit 50 also includes a remote receiver 58 and its associated antenna 58*a*. As would be readily understood by those skilled in the art, the remote transmitter 57 and remote receiver 58 may share a common antenna in other embodiments. The remote unit 50 also includes a speaker 61 or other audible signal transducer, as well as the illustrated character display 62.

Figure 3:
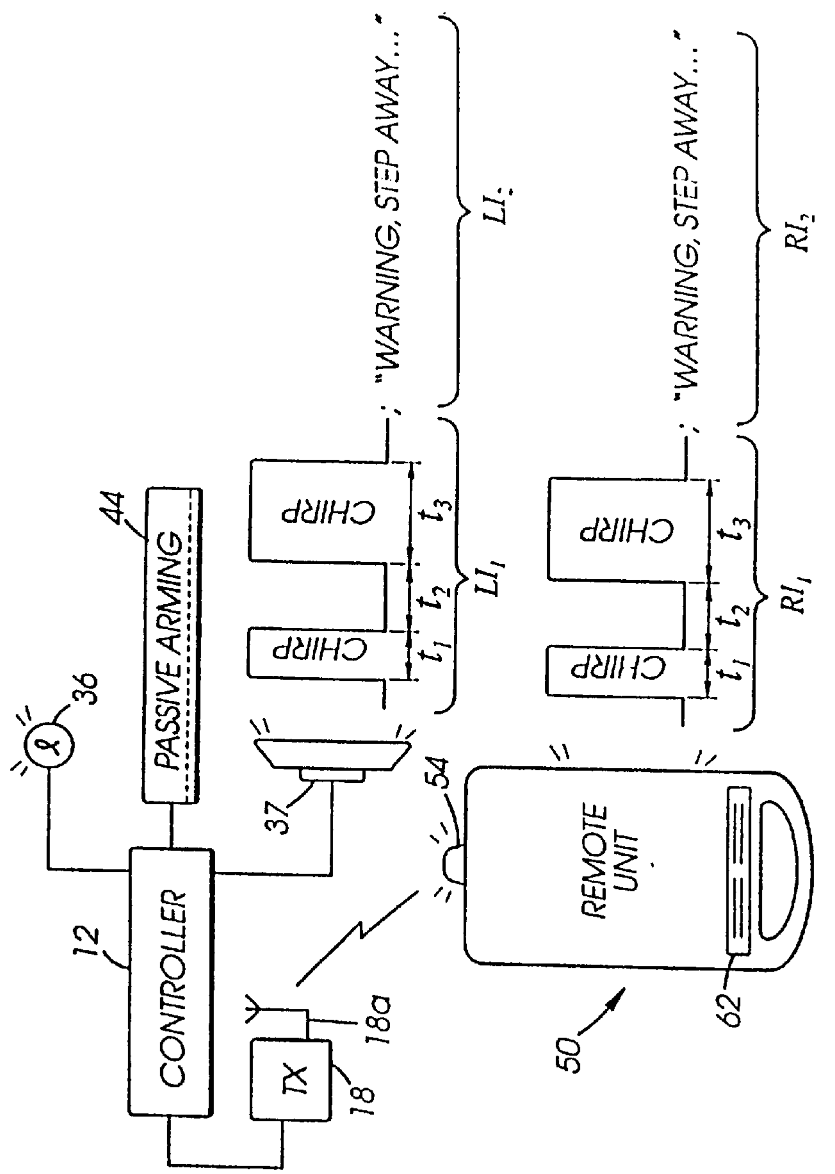
FIG. 3 is a schematic diagram of portions of the vehicle security system according to the invention and illustrating local security system indications and emulated indications at the remote unit.

Turning now additionally to FIG. 3 the vehicle security system 10 is further described. The system includes the controller 12 in the vehicle for generating a plurality of security system condition signals. For example, the controller 12 may determine that unauthorized entry has been attempted and that an alarm should be indicated. Other conditions typically of interest to the owner or user include the beginning and/or completion of passive arming, as when the owner exits the vehicle; and proximately of a person that would desirably trigger a prewarn condition, as would be readily understood by those skilled in the art. In other words, the local indicator generates a plurality of local security system condition indications adjacent the vehicle based upon respective security system condition signals from the controller 12. The local transmitter 18 generates a plurality of transmitter signals based upon respective security system condition signals from the controller.

A remote unit 50 is adapted to be carried by a user when away from the vehicle for receiving the transmitted signals from the local transmitter and for generating a plurality of remote security system indications emulating the local security system condition indications generated by the local indicator means. In various embodiments, the local indications may be one or more of audible tones, vibrations, flashing lights, speech messages, displayed messages, or combinations thereof, for example. In FIG. 3, a first local indication ($LI_1$) comprises a short chirp of the siren or horn of length $t_1$, followed by a period of silence $t_2$, then followed by a longer duration ($t_3$) chirp. This same predetermined pattern is repeated by the remote unit 50 as schematically illustrated by the first remote indication $RI_I$. As would be readily appreciated by those skilled in the art, the various durations, may be different from different indications. In addition, the pitches, amplitudes and other parameters may also be various for a given indication; however, the remote indication would still emulate the pattern of the local indication.

A second local indication $LI_2$ is illustrated in the form of a speech message such as "Warning, step away from the vehicle" which is along the lines of a typical prewarn voice message as would be readily understood by those skilled in the art. The remote unit 50 may thus generate the emulated remote indication $RI_2$ message "Warning step away from the vehicle" to thereby alert the vehicle owner when away from the vehicle that the prewarn had been triggered at the vehicle, as when a person comes within a protected zone surrounding the vehicle or bumps the vehicle thereby triggering a shock sensor. In the alternative, for example, the remote indication could be a warning illustrated bye a visual indication of characters or icons which indicate the pattern of speech.

Yet another variation of the remote emulation of the present invention is also shown in FIG. 3 wherein character displays are used to generate readable message at both the vehicle and at the remote unit. The vehicle display 44 carries the message "Passive arming", and the remote unit 50 would carry the same message on its character display 62 as may be readily provided by an LCD display as would be readily appreciated by those skilled in the art. The character displays may also generate pictorial symbols or icons as would be readily understood by those skilled in the art. The vehicle dome light 36, and remote unit LED 54 may also be flashed in the same patterns, for example, to provide corresponding indications.

The remote unit 50 may also desirably give positive feedback that a command has been successfully transmitted from the remote unit to the controller 12, such as to arm or disarm the security system, for example, upon receipt of a disarm command from the remote unit 50, the controller 12 may issue a local indication that the system has been disarmed. In accordance with the invention, the controller 12 would also effect transmission of the system condition signal to the remote unit 50 and the remote unit would indicate that the controller had been moved to the disarmed mode. Moreover, the indication at the remote device and at the vehicle would be the same pattern of indications so that the owner need be familiar with only one set of patterns, e.g., two vibrations of relatively the same duration and two audible sounds of about the same duration (see FIGS. 5–6). Many other variations of local and remote indications of security system conditions will also be appreciated by those skilled in the art. As will also be appreciated by those skilled in the art, the various embodiments of indicator means may be used individually or in various combinations.

Figure 4:
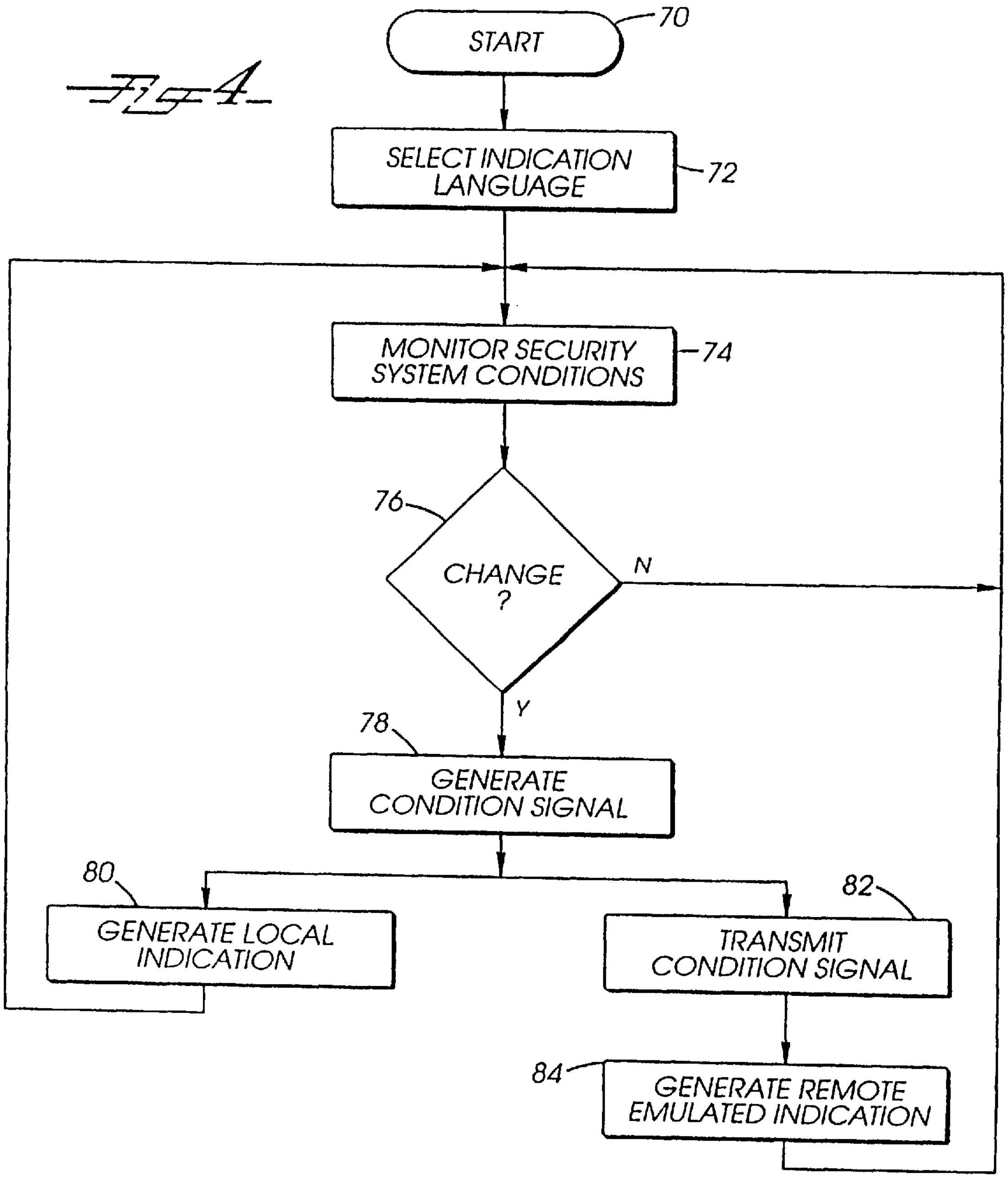
FIG. 4 is a flow chart further illustrating operation of the vehicle security system according to the invention.

Turning now additionally to the flow chart of FIG. 4, the method of operation of the invention is yet further described. From the start (Block 70), the user may, as showin in the illustrated embodiment, select a desired language as when speech messages or message displays are used. Those of skill in the art will readily appreciate that a plurality of languages may be programmed into the controller 12 and remote unit 50. The user need only initially select the desired language for the security system.

At Block 74 the controller 12 monitors the security system and if a change is detected (Block 76), the controller generates a security system condition signal at Block 78. The condition signal may then be used to generate a local indication (Block 80) and also cause transmission (Block 82) to the remote unit 50, which, in turn, causes the remote indication of the security system condition (Block 84) emulating the local indication pattern. As would be readily undkerstood by those skilled in the art, the local and remote indications need not be exactly contemporaneous; however, temporal proximity between the two indications may be desirable to promptly alert the user when away from the vehicle of a secuirty system condition, such as an alarm, for example.

Figures 5, 6:
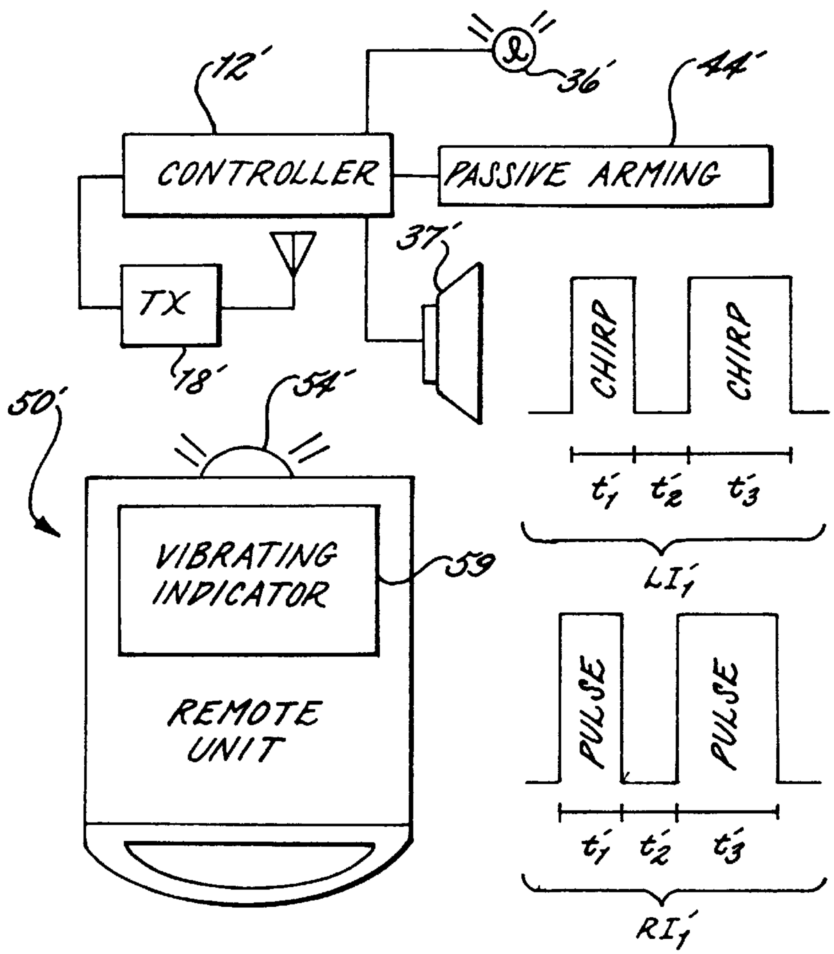
FIG. 5 is a schematic diagram of portions of the vehicle security system according to the invention and illustrating local security system indications and different indications at the remote unit which emulate a pattern correlating to the local security system indications.
FIG. 6 is a table illustrating examples of remote indications from a remote unit which emulate a pattern correlating to local indications from a local unit for various security system functions.

FIGS. 5–6 also illustrate portions of a vehicle security system 10' according to other embodiments of the invention and illustrating local security system indications and different indications at the remote unit which emulate a pattern correlating to the local security system indications. These embodiments are similar to the embodiment described above in structure and function, but emulate the pattern at the remote unit by the use of different remote indicators. In these embodiments, the system 10' preferably includes at least one vehicle sensor, e.g., sensors 20–27 and a controller 12 positioned in the vehicle for generating a plurality of security system condition signals including an alarm signal responsive to at least one of the vehicle sensors 20–27. Local indicator means is positioned at the vehicle and cooperates with the controller 12' for generating a plurality of local security system condition indications LI' to a user adjacent the vehicle based upon or responsive to respective security system condition signals from the controller 12'. A local transmitter 18 is also positioned at the vehicle and cooperates with the controller 12' for generating a plurality of transmitted signals based upon respective security system condition signals from the controller 12'.

Each of the plurality of local security system condition indications preferably is a predetermined pattern of at least one local indication. Remote indicator means, e.g., preferably provided by a remote unit 50', is adapted to be carried by the user when away from the vehicle for receiving the transmitted signals from the local transmitter and for generating a plurality of remote security system indications RI' to the user emulating the predetermined pattern of the local security system condition indications generated by the local indicator means. Each of the plurality of remote security system indications is preferably a predetermined pattern of at least one remote indication RI' and is preferably the same as the predetermined pattern of the at least one local indication LI' for the security system 10' but having a different indication. In other terms, the remote indicator means emulates the same predetermined pattern as the indications given at the vehicle by the local indicator means but uses a different indicator to indicate the pattern, e.g., tones and vibrations, tones and lights, lights and vibrations, displays and tones.

For example, the local indicator means can advantageously be provided by local audible indicator for generating each local security system condition indication as a predetermined pattern of local audible indications, and the remote indicator means can be provided by a remote vibration indicator 59 for generating each remote security system condition indication as a predetermined pattern of remote vibrating indications being the same as the predetermined pattern of the local audible indications for the security system condition. The local audible indicator, for example, can be either a vehicle horn, a vehicle siren, or other tone or sound generator which generates a tone or audible sound such as from a speaker 37'. The remote vibration indicator 59 is preferably a vibration generator such as an oscillating circuit or other vibration generator as understood by those skilled in the art. The predetermined pattern of local audible indications can be at least one continuous sound having a predetermined duration, and each predetermined pattern of remote vibrating indications can be at least one continuous vibration having about the same predetermined duration as the predetermined duration of the corresponding local continuous sound. Alternatively, the predetermined pattern of local audible indications can be a plurality of continuous sounds each having a predetermined duration and with adjacent sounds separated by predetermined time intervals, and each predetermined pattern of remote vibrating indications can be a plurality of continuous vibrations each having about the same predetermined duration as the plurality of local continuous sounds and with adjacent vibrations separated by about the same predetermined time intervals as the local adjacent sounds.

Additionally, as an alternative, the local indicator means can be a local audible indicator for generating each local security system condition indication as a predetermined pattern of local audible indications of a predetermined duration, and the remote indicator means can be a remote visual indicator for generating each remote security system condition indication as a predetermined pattern of remote visual indications, such as through the remote lamp 54' of a predetermined pattern and which is the same predetermined pattern of about the same predetermined duration as the local audible indications for the security system condition.

Further, as another alternative, the local indicator means can be a local visual indicator such as a lamp 36', exterior lights, interior lights, or other lights, or a character display 44' for generating each local security system condition indication as a predetermined pattern of local visual indications, and the remote indicator means can be a remote audible indicator such as a tone generator for generating each remote security system condition indication as a predetermined pattern of remote audible indications having the same predetermined pattern as the local visual indications for the security system condition. Alternatively, the remote indicator means can be a remote character display.

As illustrated by the table of FIG. 6, these various examples of remote indications from a remote unit emulate a pattern correlating to local indications from a local unit for various security system functions can be used according to the present invention. Each function, for example, can correspond to a set type of indicators, e.g., a local audible indicator and a remote vibration indicator. Alternatively, either or both of the local indicating means and the remote indicating means can have a plurality of types of indicator which are used for different functions. Nevertheless, the pattern of the indications is preferably the same so that the user advantageously readily recalls that two same length tones and two same length vibrations or vibrating pulses correspond to the same first function, two audible tones or sound and two flashes or pulses of a light correspond to the same second function FCN No. 2 but a different function than the first function, three long light flashes or pulses each separated by a short time interval and three long tones each separated by a short time interval correspond to the same third function FCN No. 3 but a different function than the first or second functions, two different length tones and two different length vibrating pulses each pulse corresponding in time duration to the same fourth function FNC No. 4 but a different function than the first, second, or third functions (see also FIG. 5), and so forth.

Many modifications and other embodiments of the invention will come to mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed:

1. A vehicle security system comprising:

at least one vehicle sensor;

a controller positioned in the vehicle for generating a plurality of security system condition signals including an alarm signal responsive to said vehicle sensor;

local indicator means positioned at the vehicle and cooperating with said controller for generating a plurality of local security system condition indications to a user adjacent the vehicle based upon respective security system condition signals from said controller, each of the plurality of local security system condition indications being a predetermined pattern of at least one local indication;

a local transmitter positioned at the vehicle and cooperating with said controller for generating a plurality of transmitted signals based upon respective security system condition signals from said controller; and remote indicator means adapted to be carried by the user when away from the vehicle for receiving the transmitted signals from said local transmitter and for generating a plurality of remote security system indications to the user emulating the predetermined pattern of the local security system condition indications generated by said local indicator means, each of the plurality of remote security system indications being a predetermined pattern of at least one remote indication and being the same as the predetermined pattern of the at least one local indication for the security system but having a different indication.

2. A vehicle security system according to claim 1, wherein said local indicator means comprises local audible indicator means for generating each local security system condition indication as a predetermined pattern of local audible indications, and wherein said remote indicator means comprises remote vibration indicator means for generating each remote security system condition indication as a predetermined pattern of remote vibrating indications being the same as the predetermined pattern of the local audible indications for the security system condition.

3. A vehicle security system according to claim 2, wherein the predetermined pattern of local audible indications comprises at least one continuous sound having a predetermined duration, and wherein each predetermined pattern of remote vibrating indications comprises at least one continuous vibration having about the same predetermined duration as the predetermined duration of the corresponding local continuous sound.

4. A vehicle security system according to claim 2, wherein the predetermined pattern of local audible indications comprises a plurality of continuous sounds each having a predetermined duration and with adjacent sounds separated by predetermined time intervals, and wherein each predetermined pattern of remote vibrating indications comprises a plurality of continuous vibrations each having about the same predetermined duration as the plurality of local continuous sounds and with adjacent vibrations separated by about the same predetermined time intervals as the local adjacent sounds.

5. A vehicle security system according to claim 1, wherein said local indicator means comprises local audible indicator means for generating each local security system condition indication as a predetermined pattern of local audible indications of a predetermined duration, and wherein said remote indicator means comprises remote visual indicator means for generating each remote security system condition indication as a predetermined pattern of remote visual indications of a predetermined pattern and being the same predetermined pattern of about the same predetermined duration as the local audible indications for the security system condition.

6. A vehicle security system according to claim 1, wherein said local indicator means comprises local visual indicator means for generating each local security system condition indication as a predetermined pattern of local visual indications, and wherein said remote indicator means comprises remote audible indicator means for generating each remote security system condition indication as a predetermined pattern of remote audible indications having the same predetermined pattern as the local visual indications for the security system condition.

7. A vehicle security system according to claim 1, wherein said local indicator means comprises a local character display, and wherein said remote indicator means comprises a remote character display.

8. A vehicle security system according to claim 1, wherein said remote indicator means comprises a housing, and further comprising a remote transmitter positioned in said housing for sending remote control signals to said controller.

9. A vehicle security system according to claim 1, wherein said remote indicator means has a predetermined code associated therewith, and wherein said local transmitter sends said predetermined code to the remote indicator means.

10. A vehicle security system according to claim 1, wherein said local indicating mean comprises one of a vehicle horn and a vehicle siren, and wherein said remote vehicle indicator means comprises a vibration generator.

11. A vehicle security system according to claim 1, wherein said local indicating mean comprises one of vehicle exterior lights and vehicle interior lights, and wherein said remote vehicle indicator means comprises a tone generator.

12. A vehicle security system according to claim 1, wherein said controller is movable between armed and disarmed states, wherein said controller further comprises passive arming means for moving the controller to the armed state a predetermined time after the driver has left the vehicle means for gene rating a passive arming system condition signal responsive to passive arming being initiated.

13. A vehicle security system according to claim 1, further comprising sensing means for sensing a person adjacent the vehicle, and wherein said controller further comprises means for generating a prewarn system condition signal responsive to sensing a person adjacent the vehicle.

14. A remote unit for a vehicle security system comprising a controller positioned in the vehicle for generating a plurality of security system condition signals, local indicator means positioned at the vehicle for generating a plurality of local security system condition indications to a user adjacent the vehicle responsive to respective security system condition signals from the controller, each of the plurality of local security system condition indications being a predetermined pattern of at least one local indication, and a local transmitter positioned at the vehicle for generating a plurality of transmitted signals responsive to respective security system condition signals from the controller; said remote unit comprising:

a housing adapted to be carried by a user when away from the vehicle; and remote indicator means within said housing for receiving the transmitted signals from said local transmitter and for generating a plurality of remote security system indications to a user emulating the local security system condition indications generated by the local indicator means, each of the plurality of remote security system indications being a predetermined pattern of at least one remote indication and being the same predetermined pattern as the at least one local indication for the security system but having a different indication.

15. A remote unit as defined in claim 14, wherein said local indicator means comprises local audible indicator means for generating each local security system condition indication as a predetermined pattern of local audible indications, and wherein said remote indicator means comprises remote vibration indicator means for generating each remote security system condition indication as a predetermined pattern of remote vibrating indications being the same as the predetermined pattern of the local audible indications for the security system condition.

16. A remote unit as defined in claim 15, wherein the predetermined pattern of local audible indications comprises at least one continuous sound having a predetermined duration, and wherein each predetermined pattern of remote vibrating indications comprises at least one continuous vibration having about the same predetermined duration as the predetermined duration of the corresponding local continuous sound.

17. A remote unit as defined in claim 15, wherein the predetermined pattern of local audible indications comprises a plurality of continuous sounds each having a predetermined duration and with adjacent sounds separated by predetermined time intervals, and wherein each predetermined pattern of remote vibrating indications comprises a plurality of continuous vibrations each having about the same predetermined duration as the plurality of local continuous sounds and with adjacent vibrations separated by about the same predetermined time intervals as the local adjacent sounds.

18. A remote unit as defined in claim 14, wherein said local indicator means comprises local audible indicator means for generating each local security system condition indication as a predetermined pattern of local audible indications of a predetermined duration, and wherein said remote indicator means comprises remote visual indicator means for generating each remote security system condition indication as a predetermined pattern of remote visual indications of a predetermined pattern and being the same predetermined pattern of about the same predetermined duration as the local audible indications for the security system condition.

19. A remote unit as defined in claim 14, wherein said local indicator means comprises local visual indicator means for generating each local security system condition indication as a predetermined pattern of local visual indications, and wherein said remote indicator means comprises remote audible indicator means for generating each remote security system condition indication as a predetermined pattern of remote audible indications having the same predetermined pattern as the local visual indications for the security system condition.

20. A remote unit as defined in claim 14, wherein said local indicator means comprises a local character display, and wherein said remote indicator means comprises a remote character display.

21. A remote unit as defined in claim 14, wherein said remote indicator means has a predetermined code associated therewith, and wherein said local transmitter sends said predetermined code to the remote indicator means.

22. A remote unit as defined in claim 14, wherein said local indicating mean comprises one of a vehicle horn and a vehicle siren, and wherein said remote vehicle indicator means comprises a vibration generator.

23. A remote unit as defined in claim 14, wherein said local indicating mean comprises one of vehicle exterior lights and vehicle interior lights, and wherein said remote vehicle indicator means comprises a tone generator.

24. A remote unit as defined in claim 14, wherein said controller is movable between armed and disarmed states, wherein said controller further comprises passive arming means for moving the controller to the armed state a predetermined time after the driver has left the vehicle means for generating a passive arming system condition signal responsive to passive arming being initiated.

25. A remote unit as defined in claim 14, further comprising sensing means for sensing a person adjacent the vehicle, and wherein said controller further comprises means for generating a prewarn system condition signal responsive to sensing a person adjacent the vehicle.

26. A method for operating a vehicle security system comprising a controller positioned in the vehicle for generating a plurality of security system condition signals and a remote unit cooperating with the controller, the method comprising the steps of:

generating a plurality of local security system condition indications to a user adjacent the vehicle responsive to respective security system condition signals from the controller, each of the plurality of local security system condition indications being a predetermined pattern of at least one local indication;

generating a plurality of transmitted signals responsive to respective security system condition signals from the controller; and receiving the transmitted signals and generating at the remote unit a plurality of remote security system indications to a user which emulate the local security system condition indications generated by the local indicator means, each of the plurality of remote security system indications being a predetermined pattern of at least one remote indication and being the same as the predetermined pattern of the at least one local indication for the security system but being a different indication.

27. A method according to claim 26, wherein the step of generating each local security system condition indication comprises generating each as a predetermined pattern of local audible indications, and wherein the step of generating each remote security system condition indication comprises generating each as a predetermined pattern of remote vibrating indications which emulate the local audible indications for the security system condition.

28. A method according to claim 26, wherein the step of generating each local security system condition indication comprises generating a local message on a local character display, and wherein the step of generating each remote security system condition indication comprises generating a remote message on a remote character display correlating to the same pattern of message as the local message for the security system condition.

29. A method according to claim 26, further comprising the step of sending remote control signals to the controller.

* * * * *

UNITED STATES PATENT AND TRADEMARK OFFICE
CERTIFICATE OF CORRECTION

PATENT NO. : 5,973,592
DATED : October 26, 1999
INVENTOR(S) : Kenneth E. Flick

It is certified that error appears in the above-identified patent and that said Letters Patent is hereby corrected as shown below:

| | |
|---|---|
| Column 6, line 34 | Strike: "as showin in"<br>Insert: - -as shown in- - |
| Column 6, line 49 | Strike: "undkerstood by"<br>Insert: - -understood by- - |
| Column 10, line 23 | Strike: "gene rating"<br>Insert: - -generating- - |

Signed and Sealed this

Sixteenth Day of May, 2000

Attest:

Q. TODD DICKINSON

*Attesting Officer* *Director of Patents and Trademarks*